(12) United States Patent
Yu et al.

(10) Patent No.: US 12,314,148 B2
(45) Date of Patent: May 27, 2025

(54) DATA STORAGE METHOD USING INTERNAL AND EXTERNAL SOURCE TRACING REGIONS OF A MAGNETIC DISK AND APPARATUS, AND ELECTRONIC DEVICE AND READABLE STORAGE MEDIUM

(71) Applicant: SUZHOU METABRAIN INTELLIGENT TECHNOLOGY CO., LTD., Jiangsu (CN)

(72) Inventors: Luxian Yu, Jiangsu (CN); Bin Hou, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/566,639

(22) PCT Filed: Apr. 28, 2022

(86) PCT No.: PCT/CN2022/089846
§ 371 (c)(1),
(2) Date: Dec. 2, 2023

(87) PCT Pub. No.: WO2023/092942
PCT Pub. Date: Jun. 1, 2023

(65) Prior Publication Data
US 2024/0264915 A1    Aug. 8, 2024

(30) Foreign Application Priority Data
Nov. 23, 2021    (CN) .......................... 202111389821.5

(51) Int. Cl.
*G06F 11/26* (2006.01)
*G06F 11/22* (2006.01)
*G06F 11/263* (2006.01)

(52) U.S. Cl.
CPC ........ *G06F 11/263* (2013.01); *G06F 11/2273* (2013.01)

(58) Field of Classification Search
CPC .... G06F 11/263; G06F 11/2273; G06F 3/067; G06F 3/0619; G06F 3/065
See application file for complete search history.

(56) References Cited

U.S. PATENT DOCUMENTS

| 5,541,784 A * | 7/1996 | Cribbs ............... G11B 5/59633 360/77.06 |
| 2007/0061511 A1 | 3/2007 | Faber |

(Continued)

FOREIGN PATENT DOCUMENTS

| CN | 107193754 A | 9/2017 |
| CN | 109032536 A | 12/2018 |

(Continued)

*Primary Examiner* — Kamini B Patel
(74) *Attorney, Agent, or Firm* — IPro, PLLC

(57) ABSTRACT

The present disclosure discloses a data storing method, an apparatus, an electronic device and a readable storage medium, wherein the method includes: constructing a data region and an external source-tracing region in a magnetic disk of a distributed storage system in advance, wherein the data region and the external source-tracing region have a corresponding relation, and in an internal memory, simultaneously constructing an internal source-tracing region that corresponds to the external source-tracing region; when it is detected that the data region is written with a target datum, writing source-tracing information corresponding to the target datum into the internal source-tracing region; and downwardly swiping the data of the internal source-tracing region to the external source-tracing region, to store the source-tracing information of the data region by the external source-tracing region. Therefore, the data may be accurately and efficiently recovered, and the reason for data loss is timely determined.

20 Claims, 3 Drawing Sheets

(56) References Cited

U.S. PATENT DOCUMENTS

2007/0105678 A1* 5/2007 Bucknor ................ B60K 6/445
                                                        475/5
2022/0084554 A1* 3/2022 Maruyama .......... G06F 11/1004
2023/0078081 A1* 3/2023 Lai .......................... G06F 3/061
                                                       707/797

FOREIGN PATENT DOCUMENTS

| CN | 109213445 A | 1/2019 |
| CN | 109669632 A | 4/2019 |
| CN | 112000623 A | 11/2020 |
| CN | 112486717 A | 3/2021 |
| CN | 113835643 A | 12/2021 |
| WO | 2013091244 A1 | 6/2013 |

* cited by examiner

DATA STORAGE METHOD USING INTERNAL AND EXTERNAL SOURCE TRACING REGIONS OF A MAGNETIC DISK AND APPARATUS, AND ELECTRONIC DEVICE AND READABLE STORAGE MEDIUM

CROSS REFERENCE TO RELEVANT APPLICATIONS

The present application claims the priority of the Chinese patent application filed on Nov. 23, 2021 before the Chinese Patent Office with the application number of 202111389821.5 and the title of "DATA STORAGE METHOD AND APPARATUS, AND ELECTRONIC DEVICE AND READABLE STORAGE MEDIUM", which is incorporated herein in its entirety by reference.

TECHNICAL FIELD

The present disclosure relates to the technical field of computers and, more particularly, to a data storing method, an apparatus, an electronic device and a readable storage medium.

BACKGROUND

With the rapid development and the extensive application in the daily working and life of the technology of the Internet, data shows explosive growth, the storage technique correspondingly develops, and distributed storage systems having an excellent storage performance accordingly emerge, which is used to store the mass quantity of data. It may be understood that, when the data are stored into the distributed storage system, firstly it is required to ensure the data consistency, especially in fault scenes, for example, a series of uncertain factors such as power outages, network outage and disk damage. Inevitably, external users might destroy the original data by operations such as modification and deletion. In addition, the distributed storage system, when saving the datum, breaks up a continuous block of the datum, and saves the pieces into the different regions of the different hard disks. All of those cause that, in the application scenes of the obtainment of the original data, the data recovery has a high difficulty, resulting that the source of the erroneous data cannot be accurately and efficiently determined, and the reason why the erroneous data generate cannot be determined.

SUMMARY

The present disclosure provides a data storing method, an apparatus, an electronic device and a readable storage medium, which may accurately and efficiently recover the data, and timely determine the reason for data loss.

In order to solve the above technical problem, the embodiments of the present disclosure provide the following technical solutions:

An aspect of the embodiments of the present disclosure provides a data storing method, wherein the method includes:

constructing a data region and an external source-tracing region in a magnetic disk of a distributed storage system in advance, wherein the data region and the external source-tracing region have a corresponding relation, and in an internal memory, simultaneously constructing an internal source-tracing region corresponding to the external source-tracing region;

when it is detected that the data region is written with a target datum, writing source-tracing information corresponding to the target datum into the internal source-tracing region; and downwardly swiping the data of the internal source-tracing region to the external source-tracing region, to store the source-tracing information of the data region by using the external source-tracing region.

In some embodiments, after downwardly swiping the data of the internal source-tracing region to the external source-tracing region, the method further includes:

when a data-consistency-test injection fault instruction is received, based on the corresponding relation, according to an address of the data region, calculating an address of the external source-tracing region; and based on the address of the external source-tracing region, from the external source-tracing region, obtaining data-source information corresponding to data blocks within the data region.

In some embodiments, after downwardly swiping the data of the internal source-tracing region to the external source-tracing region, the method further includes:

when it is detected that a production environment has a fault, based on the corresponding relation, according to an address of the data region, calculating an address of the external source-tracing region; and based on the address of the external source-tracing region, from the external source-tracing region, obtaining data-source information corresponding to data blocks within the data region.

In some embodiments, after downwardly swiping the data of the internal source-tracing region to the external source-tracing region, the method further includes:

scanning the data region; and determining data-source information within the external source-tracing region that corresponds to each of blocks of data within the data region, and joining data that are physically discontinuous within the data region into a logical continuous datum, to perform a data-recovery operation.

In some embodiments, after downwardly swiping the data of the internal source-tracing region to the external source-tracing region, the method further includes:

when it is detected that a source-tracing-region recovering condition is satisfied, sending a source-tracing-region recovering instruction; and based on the source-tracing-region recovering instruction, converting the external source-tracing region into the data region for storing a to-be-written datum.

In some embodiments, the step of, when it is detected that the source-tracing-region recovering condition is satisfied, sending the source-tracing-region recovering instruction includes:

in response to that a residual-space-capacity value of the data region is less than a preset capacity threshold, determining that the source-tracing-region recovering condition is satisfied; and in response to that the residual-space-capacity value of the data region is greater than or equal to the preset capacity threshold, determining that the source-tracing-region recovering condition is not satisfied.

In some embodiments, when it is detected that the source-tracing-region recovering condition is satisfied, sending the source-tracing-region recovering instruction includes:

in response to that a disk-space utilization ratio is greater than a preset threshold, determining that the source-tracing-region recovering condition is satisfied; and in response to that the disk-space utilization ratio is less than or equal to the preset capacity threshold, determining that the source-tracing-region recovering condition is not satisfied.

Another aspect of the embodiments of the present disclosure provides a data storing apparatus, wherein the apparatus includes:

a pre-deploying module configured for constructing a data region and an external source-tracing region in a magnetic disk of a distributed storage system in advance, wherein the data region and the external source-tracing region have a corresponding relation, and in an internal memory, simultaneously constructing an internal source-tracing region corresponding to the external source-tracing region;

a data writing module configured for, when it is detected that the data region is written with a target datum, writing source-tracing information corresponding to the target datum into the internal source-tracing region; and a data storing module configured for downwardly swiping the data of the internal source-tracing region to the external source-tracing region, to store the source-tracing information of the data region by using the external source-tracing region.

In some embodiments, the data storing apparatus further includes:

a recovering module configured for, when it is detected that a source-tracing-region recovering condition is satisfied, sending a source-tracing-region recovering instruction; and based on the source-tracing-region recovering instruction, converting the external source-tracing region into the data region for storing a to-be-written datum.

In some embodiments, the recovering module includes a recovery-condition determining unit, and the recovery-condition determining unit is configured for determining whether a residual-space-capacity value of the data region is less than a preset capacity threshold; when the residual-space-capacity value of the data region is less than the preset capacity threshold, determining that the source-tracing-region recovering condition is satisfied; and when the residual-space-capacity value of the data region is greater than or equal to the preset capacity threshold, determining that the source-tracing-region recovering condition is not satisfied.

In some embodiments, the recovering module includes a recovery-condition determining unit, and the recovery-condition determining unit is configured for determining whether a disk-space utilization ratio is greater than a preset threshold: when the disk-space utilization ratio is greater than the preset threshold, determining that the source-tracing-region recovering condition is satisfied; and when the disk-space utilization ratio is less than or equal to the preset capacity threshold, determining that the source-tracing-region recovering condition is not satisfied.

An embodiment of the present disclosure further provides an electronic device, wherein the electronic device includes a processor and a memory, and the processor is configured for, when executing a computer program stored in the memory, implementing the steps of the data storing method according to any one of the above embodiments.

An embodiment of the present disclosure finally further provides a readable storage medium, wherein the readable storage medium stores a computer program, and the computer program, when executed by a processor, implements the steps of the data storing method according to any one of the above embodiments.

The advantages of the technical solutions according to the present disclosure are as follows. The data region for writing the data and the source-tracing region for recording the source-tracing information of each of the blocks of data within the data region are constructed in the disk space, the source information of the datum that is written by the distributed storage system each time is extracted and written into the reserved hard-disk space according to the prescribed format, and when a fault happens or the datum is destroyed, the process of the generating of the modification of the datum may be traced, and the true data region may be repaired according to the source-tracing data. Therefore, the data may be accurately and efficiently recovered, and the reason for data loss is timely determined.

Furthermore, with respect to the data storing method, the embodiments of the present disclosure further provide the corresponding implementing apparatus, the electronic device and the readable storage medium, which further enables the method to have more practical applicability, and the apparatus, the electronic device and the readable storage medium have the corresponding advantages.

It should be understood that the above general description and the following detailed description are merely exemplary, and cannot limit the present disclosure.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are merely some embodiments of the present disclosure, and a person skilled in the art may obtain other figures according to these figures without paying creative work.

DETAILED DESCRIPTION

In order to enable a person skilled in the art to better comprehend the solutions of the present disclosure, the present disclosure will be described in further detail below with reference to the drawings and the embodiments. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

The terms such as "first", "second", "third" and "fourth" in the description, the claims and the drawings of the present disclosure are intended to distinguish different objects, and are not intended to describe a particular sequence. Moreover, the terms "include" and "have" and any variation thereof are intended to cover non-exclusive inclusions. For example, a process, a method, a system, a product or a device that includes a series of steps or units is not limited to those steps or units that have been listed, but may include steps or units that are not listed.

After the technical solutions of the embodiments of the present disclosure is introduced, the non-limiting embodiments of the present disclosure will be described in detail below.

Figure 1:
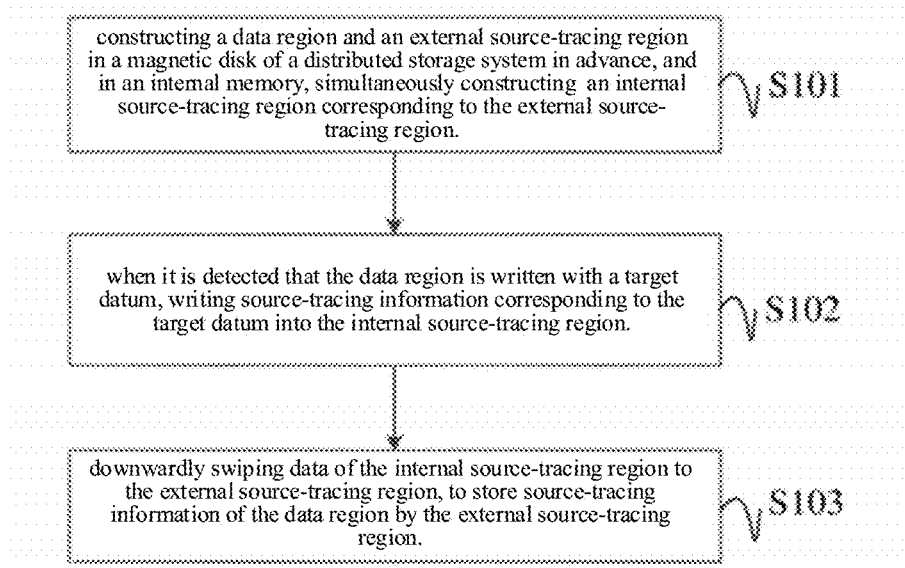
FIG. 1 is a schematic flow chart of a data storing method according to an embodiment of the present disclosure.

Firstly, referring to FIG. 1. FIG. 1 is a schematic flow chart of a data storing method according to an embodiment of the present disclosure. The embodiment of the present disclosure may include the following contents:

S101: constructing a data region and an external source-tracing region in a magnetic disk of a distributed storage system in advance, and in an internal memory, simultaneously constructing an internal source-tracing region corresponding to the external source-tracing region.

In the present embodiment, in all of the magnetic disks or some specified magnetic disks of the distributed storage system, two major regions are constructed in advance, i.e., the data region and the source-tracing region. Certainly, besides the data region and the source-tracing region, the magnetic disk may further have other regions, for example, a file buffer region for storing small files, which does not affect the implementation of the present disclosure. The data region is used to store the datum that is actually written, and, in normal cases, the source-tracing region is used to save the source-tracing information of the written datum. The source-tracing information is used to describe the attribute information of the datum that is actually written, for example, the serial number of the data writing, the value of the occupied space capacity, the storage position, and so on. In order to distinguish them, the source-tracing region in the magnetic disk may be referred to as the external source-tracing region. The source-tracing region permanently resides in the internal memory, and the source-tracing region in the internal memory may be referred to as the internal source-tracing region, which corresponds to the external source-tracing region in the hard disk. The data region and the external source-tracing region have a corresponding relation. In order to increase the utilization ratio of the entire magnetic disk, the data region and the source-tracing region may employ the mode of linear correspondence: in other words, it is merely required to simply calculate, and the source-tracing region corresponding to a certain block of the data region may be obtained. In other words, by the address of the data region, the address of the corresponding source-tracing region may be obtained by calculation, and it is not required to additionally store the corresponding relation between the data region and the external source-tracing region.

S102: when it is detected that the data region is written with a target datum, writing source-tracing information corresponding to the target datum into the internal source-tracing region.

In the present embodiment, the target datum refers to the datum that the user intends to write into the distributed storage system, i.e., the to-be-written datum.

S103: downwardly swiping the data of the internal source-tracing region to the external source-tracing region, to store the source-tracing information of the data region by the external source-tracing region.

Figure 2:
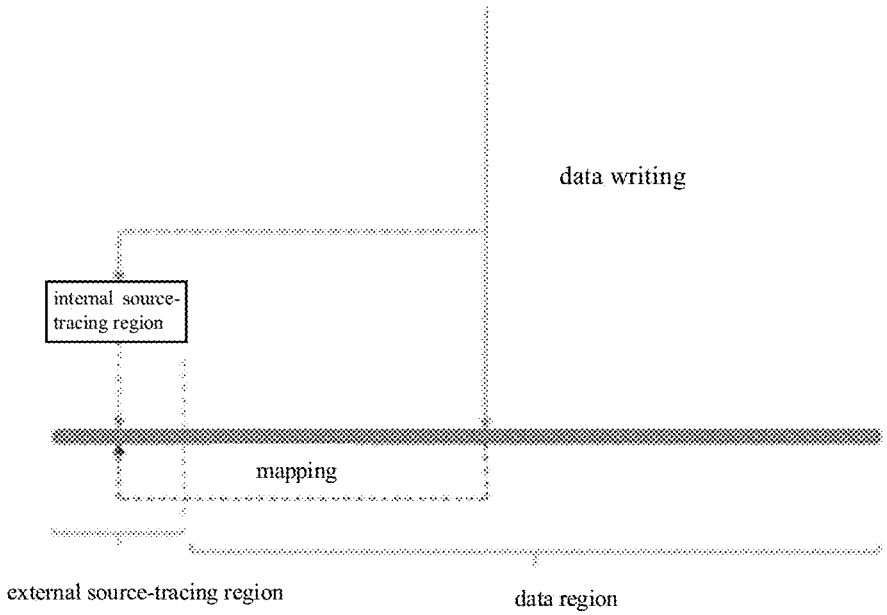
FIG. 2 is a schematic diagram of the frame of an exemplary application scene according to an embodiment of the present disclosure.

In the present embodiment, the user issues a data writing instruction. In other words, after the to-be-written datum enters the distributed system, it is firstly written into the data region, and subsequently written into the internal source-tracing region in the internal memory, and each time after the data region is completely written, the source-tracing region is modified asynchronously. As an example, the internal source-tracing region may downwardly swipe the datum to the external source-tracing region in the hard disk according to the mode of 4K aligning, as shown in FIG. 2, the data-source information of each time of the data writing operation in the distributed storage system is saved to the external source-tracing region in the hard disk, whereby the process of the generating of the modification of each of the blocks of data within the data region may be recorded.

In the technical solutions according to the embodiments of the present disclosure, the data region for writing the data and the source-tracing region for recording the source-tracing information of each of the blocks of data within the data region are constructed in the disk space, the source information of the datum that is written by the distributed storage system each time is extracted and written into the reserved hard-disk space according to the prescribed format, and when a fault happens or the datum is destroyed, the process of the generating of the modification of the datum may be traced, and the true data region may be repaired according to the source-tracing information. Therefore, the data may be accurately and efficiently recovered, and the reason for data loss is timely determined.

It should be noted that the steps according to the present disclosure do not have a strict execution sequence, and as long as a logical sequence is satisfied, then those steps may be executed simultaneously, and may also be executed in a certain preset sequence. FIG. 1 is merely an illustrative mode, and does not mean that the execution sequence may merely be such a sequence.

It may be understood that the distributed storage system may perform a data-consistency test before getting online. The main means of the data-consistency test of the distributed storage system is to perform fault injection, to simulate the occurrence of disasters of different degrees, and it is required to, when a disaster happens, timely determine the reason for the data loss and perform data recovery. Based on this, on the basis of the above embodiments, the method may further include:

when a data-consistency-test injection fault instruction is received, based on the corresponding relation between the data region and the external source-tracing region, according to an address of the data region, calculating an address of the external source-tracing region; and based on the address of the external source-tracing region, from the external source-tracing region, obtaining data-source information corresponding to data blocks in the data region.

The fault-injection test is performed at the distributed storage system, the source-tracing information by calculation according to the data region may be obtained, the process of the generating of the modification of the datum is obtained by parsing, the reason for the data loss is obtained by analyzing, and recovering of a part of the datum is performed.

In addition, when it is detected that a production environment has a fault, based on the corresponding relation between the data region and the external source-tracing region, according to an address of the data region, an address of the external source-tracing region is calculated; and based on the address of the external source-tracing region, from the external source-tracing region, data-source information corresponding to data blocks within the data region is obtained.

When a fault happens or the production environment has a disaster, the information of the source-tracing region is obtained by calculation according to the data region, the process of the generating of the modification of the datum is obtain by parsing, the reason for the data corruption or data loss is analyzed, and data recovery is performed.

On the basis of the above embodiments, the present embodiment further provides an embodiment of the data-recovery operation, which may include:

scanning the data region; and determining a data-source information within the external source-tracing region that corresponds to each of blocks of data within the data region, and joining data that are physically discontinuous within the data region into a logical continuous datum, to perform a data-recovery operation.

It may be understood that the distributed storage system, when saving the datum, breaks up a continuous block of the datum, and saves the pieces into the different regions of the different hard disks, and therefore the datum within the data region in the hard disk is a discontinuous datum. However, because the external source-tracing region records the process of the happening of the modification of each of the blocks of data within the data region, by scanning each of the data blocks within the data region, the information of the source-tracing region corresponding to each of the blocks of data is obtained by calculation according to the data region, and after parsing, data may be performed to be recovered to a certain extent, and the discontinuous datum in the hard disk is joined into a logically continuous datum and returned.

Inevitably, the distributed storage system might suddenly have the read-write operation of a large quantity of data, which results in an insufficient available capacity of the data region, and affects the storage system of the entire distributed storage system. In order to deal with such a situation of data surge, the present embodiment further provides an embodiment of capacity recovery, which may include:

when it is detected that a source-tracing-region recovering condition is satisfied, sending a source-tracing-region recovering instruction; and based on the source-tracing-region recovering instruction, converting the external source-tracing region into the data region for storing a to-be-written datum.

In the above embodiment, how to execute the determination of the source-tracing-region recovering condition is not limited. The present embodiment provides an alternative mode of determining the source-tracing-region recovering condition: in other words, the step of, when it is detected that the source-tracing-region recovering condition is satisfied, sending the source-tracing-region recovering instruction includes the following steps:

determining whether a residual-space-capacity value of the data region is less than a preset capacity threshold: when the residual-space-capacity value of the data region is less than the preset capacity threshold, determining that the source-tracing-region recovering condition is satisfied; and when the residual-space-capacity value of the data region is greater than or equal to the preset capacity threshold, determining that the source-tracing-region recovering condition is not satisfied. The present disclosure further provides another mode of determining the source-tracing-region recovering condition, which is parallel to the above embodiment and therefore may serve as another alternative embodiment, which may include:

determining whether a disk-space utilization ratio is greater than a preset threshold; when the disk-space utilization ratio is greater than the preset threshold, determining that the source-tracing-region recovering condition is satisfied; and when the disk-space utilization ratio is less than or equal to the preset capacity threshold, determining that the source-tracing-region recovering condition is not satisfied.

The preset threshold and the preset capacity threshold may be selected flexibly according to practical situations, which does not affect the implementation of the present disclosure. The system may directly read the residual-space-capacity value or the space utilization ratio of the data region from the configuration information or the register, and subsequently make the determination based on the read parameters by using the corresponding manner. For that the parameter of the disk-space utilization ratio requires being additionally calculated, a script of a program for calculating the space utilization ratio may be disposed in advance, the disk-space utilization ratio is monitored in real time by invoking the script.

In the present embodiment, when the disk-space utilization ratio is high or the capacity of the data region is insufficient, the external source-tracing region is recovered, and converted into the data region for usage, whereby the data writing may be continued, which is used to deal with short-time burst traffic, to effectively improve the storage performance of the distributed storage system.

With respect to the data storing method, the embodiments of the present disclosure further provide the corresponding apparatus, which further enables the method to have more practical applicability. The apparatus may be described from the perspective of the functional modules and the perspective of the hardware. The data storing apparatus according to an embodiment of the present disclosure may be described below. The data storing apparatus described below and the data storing method described above may correspondingly refer to each other.

Figure 3:
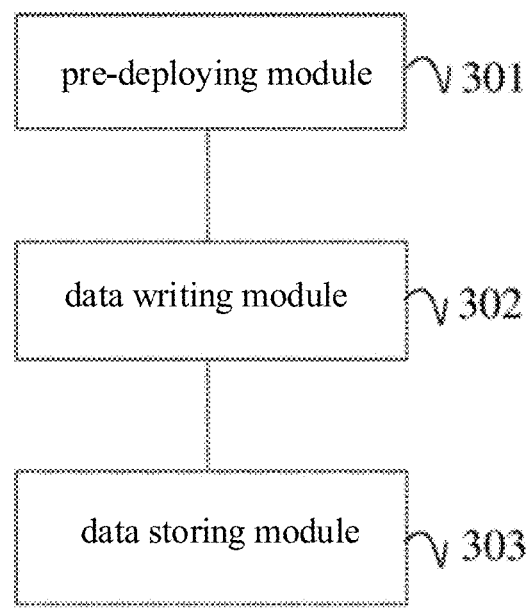
FIG. 3 is a structural diagram of a particular embodiment of a data storing apparatus according to an embodiment of the present disclosure.

In the perspective of the functional modules, referring to FIG. 3, FIG. 3 is a structural diagram of an embodiment of a data storing apparatus according to an embodiment of the present disclosure. The apparatus may include:

a pre-deploying module 301 configured for constructing a data region and an external source-tracing region in a magnetic disk of a distributed storage system in advance, wherein the data region and the external source-tracing region have a corresponding relation, and in an internal memory, simultaneously constructing an internal source-tracing region corresponding to the external source-tracing region;

a data writing module 302 configured for, when it is detected that the data region is written with a target datum, writing source-tracing information corresponding to the target datum into the internal source-tracing region; and a data storing module 303 configured for downwardly swiping the data of the internal source-tracing region to the external source-tracing region, to store the source-tracing information of the data region by the external source-tracing region.

In some embodiments, in some implementations of the present embodiment, the apparatus may further include a source-tracing module configured for, when a data-consistency-test injection fault instruction is received, based on the corresponding relation, according to an address of the data region, calculating an address of the external source-tracing region; and based on the address of the external source-tracing region, from the external source-tracing region, obtaining data-source information corresponding to data blocks within the data region.

As another alternative implementation of the present embodiment, the source-tracing module may further be configured for, when it is detected that a production environment has a fault, based on the corresponding relation, according to an address of the data region, calculating an address of the external source-tracing region; and based on the address of the external source-tracing region, from the external source-tracing region, obtaining data-source information corresponding to data blocks within the data region.

In some embodiments, in some other implementations of the present embodiment, the apparatus may further include a recovering module configured for scanning the data region; and determining a data-source information within the external source-tracing region that corresponds to each of blocks of data within the data region, and joining data that are physically discontinuous within the data region into a logical continuous datum, to perform a data-recovery operation.

In some embodiments, in some other implementations of the present embodiment, the apparatus may further include, for example, a recovering module configured for, when it is detected that a source-tracing-region recovering condition is satisfied, sending a source-tracing-region recovering instruction; and based on the source-tracing-region recovering instruction, converting the external source-tracing region into the data region for storing a to-be-written datum.

As an alternative implementation of the above embodiment, the recovering module includes a recovery-condition determining unit configured for determining whether a residual-space-capacity value of the data region is less than a preset capacity threshold: when the residual-space-capacity value of the data region is less than the preset capacity threshold, determining that the source-tracing-region recovering condition is satisfied; and when the residual-space-capacity value of the data region is greater than or equal to the preset capacity threshold, determining that the source-tracing-region recovering condition is not satisfied.

As an embodiment parallel to the above embodiment, the recovery-condition determining unit may further be configured for determining whether a disk-space utilization ratio is greater than a preset threshold: when the disk-space utilization ratio is greater than the preset threshold, determining that the source-tracing-region recovering condition is satisfied; and when the disk-space utilization ratio is less than or equal to the preset capacity threshold, determining that the source-tracing-region recovering condition is not satisfied.

The functions of the functional modules of the data storing apparatus according to an embodiment of the present disclosure may be implemented by using the methods in the above process embodiments, and the implementing processes may refer to the relevant description on the above method embodiments, and are not discussed further herein.

It may be seen from the above that in the embodiments of the present disclosure, the data may be accurately and efficiently recovered, and the reason for data loss is timely determined.

Figure 4:
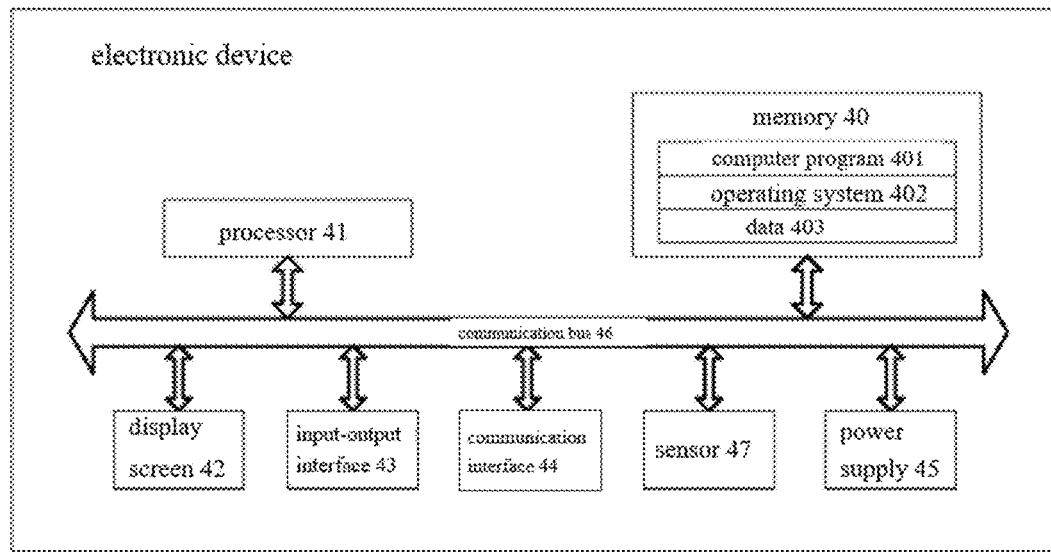
FIG. 4 is a structural diagram of a particular embodiment of an electronic device according to an embodiment of the present disclosure.

The data storing apparatus mentioned above is described in the perspective of the functional modules. In some embodiments, the present disclosure further provides an electronic device, which is described in the perspective of the hardware. FIG. 4 is a schematic structural diagram of an implementation of an electronic device according to an embodiment of the present disclosure. As shown in FIG. 4, the electronic device includes a memory 40 configured for storing a computer program; and a processor 41 configured for, when executing the computer program, implementing the steps of the data storing method according to any one of the above embodiments.

The processor 41 may include one or more processing cores, for example, a 4-core processor and an 8-core processor. The processor 41 may also be a controller, a microcontroller, a microprocessor or other data processing chips. The processor 41 may be implemented in at least one of the hardware forms of digital signal processing (DSP), field-programmable gate array (FPGA) and programmable logic array (PLA). The processor 41 may also include a host processor and a co-processor. The host processor refers to a processor that processes the data in the awakening state, and is also referred to as a central processing unit (CPU). The co-processor refers to a low-power-consumption processor that processes the data in the standby state. In some embodiments, the processor 41 may be integrated with a graphics processing unit (GPU), wherein the GPU is configured for rendering and drawing the contents that the display screen is required to display. In some embodiments, the processor 41 may further include an artificial intelligence (AI) processor, wherein the AI processor is configured for processing the calculating operations related to machine learning.

The memory 40 may include one or more computer-readable storage mediums, wherein the computer-readable storage mediums may be non-transient. The memory 40 may further include a high-speed random access memory and a non-volatile memory, for example, one or more magnetic-disk storage devices and flash-memory storage devices. In some embodiments, the memory 40 may be an internal storage unit of the electronic device, for example, a hard disk of a server. In some other embodiments, the memory 40 may also be an external storage device of the electronic device, for example, a plug-connected hard disk, a smart media card (SMC), a secure digital (SD) card, a Flash Card. and so on, that a server is equipped with. In some embodiments, the memory 40 may also include not only the internal storage unit of the electronic device but also the external storage device. The memory 40 cannot only be used to store the application software installed in the electronic device and various types of data, for example, a code for executing a program of the bug processing method, and may also be used to temporarily store the data that have already been outputted or will be outputted. In the present embodiment, the memory 40 is at least configured for storing the following computer program 401, wherein the computer program, after being loaded and executed by the processor 41, may implement the relevant steps of the data storing method according to any one of the above embodiments. Additionally, the resources stored by the memory 40 may further include an operating system 402, data 403 and so on, wherein the storage mode may be short-term storage or permanent storage. The operating system 402 may include Windows, Unix, Linux and so on. The data 403 may include but are not limited to the data corresponding to the result of the data 10) storage.

In some embodiments, the above electronic device may further include a display screen 42, an input-output interface 43, a communication interface 44 (also referred to as a network interface), a power supply 45 and a communication bus 46. The display screen 42 and the input-output interface 43 such as a keyboard belongs to user interfaces, and user interfaces may also include standard wired interfaces, wireless interfaces and so on. In some embodiments, the display may be an LED display, a liquid-crystal display, a touch-controlled liquid-crystal display, an organic light emitting diode (OLED) touch sensor, and so on. The display may also be properly referred to as a display screen or a displaying unit, and is used to display the information processed in the electronic device and used to display a visualized user interface. The communication interface 44 may, in some embodiments, include a wired interface and/or a wireless interface, for example, a WI-FI interface and a Bluetooth interface, and is usually used to establish a communicative connection between the electronic device and other electronic devices. The communication bus 46 may be a peripheral component interconnect (referred to for short as PCI) bus or an extended industry standard architecture (referred to for short as EISA) bus and so on. The bus may be divided to be an address bus, a data bus, a control bus and so on. In order to facilitate the illustration, it is merely represented by a thick line in FIG. 4, but that does not mean that there is merely one bus or one type of bus.

A person skilled in the art may understand that the structure shown in FIG. 4 does not construct a limitation to the electronic devices, and the device may include components more or fewer than those illustrated: for example, it may further include sensors 47 that realize various type of functions.

The functions of the functional modules of the electronic device according to an embodiment of the present disclosure may be implemented according to the above methods in the above method embodiments, and the implementing processes may refer to the relevant description on the above method embodiments, and are not discussed further herein.

It may be seen from the above that in the embodiments of the present disclosure, the data may be accurately and efficiently recovered, and the reason for data loss may timely be determined.

It may be understood that the data storing method according to the above embodiments, when implemented in the form of software function units and sold or used as an independent product, may be stored in a computer-readable storage medium. On the basis of such a comprehension, the substance of the technical solutions of the present disclosure, or the part thereof that makes a contribution over the prior art, or the whole or a part of the technical solutions, may be embodied in the form of a software product. The computer software product is stored in a storage medium, and implements all or some of the steps of the methods according to the embodiments of the present disclosure. Moreover, the above-described storage medium includes various media that may store a program code, such as a USB flash disk, a mobile hard disk drive, a read-only memory (ROM), a random access memory (RAM), an electrically erasable programmable ROM, a register, a hard disk, a multimedia card, a card-type memory (for example, a SD or DX memory and so on), a magnetic memory, a movable magnetic disk, a CD-ROM, a diskette and an optical disk.

Figure 5:
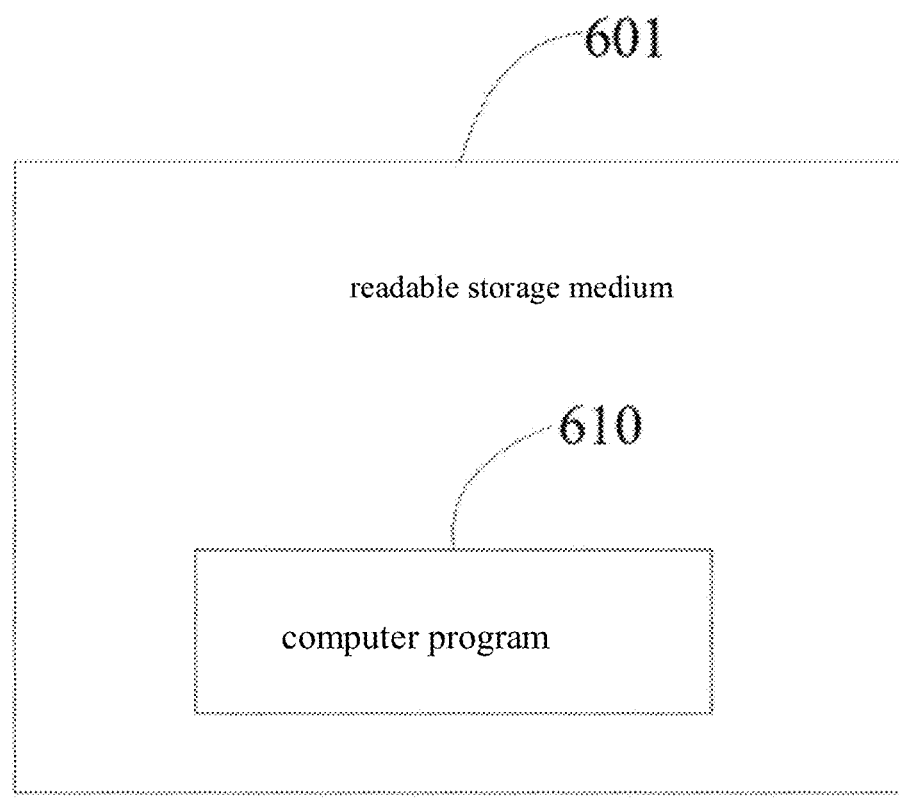
FIG. 5 is a structural diagram of a readable storage medium of an electronic device according to an embodiment of the present disclosure.

On that basis. FIG. 5 is a structural diagram of a readable storage medium of an electronic device according to an embodiment of the present disclosure. As shown in FIG. 5, an embodiment of the present disclosure further provides a readable storage medium 601, wherein the readable storage medium 601 stores a computer program 610, and the computer program 610, when executed by a processor, implements the steps of the data storing method according to any one of the above embodiments.

The embodiments of the description are described in the mode of progression, each of the embodiments emphatically describes the differences from the other embodiments, and the same or similar parts of the embodiments may refer to each other. Regarding the hardware according to the embodiments, including the apparatus and the electronic device, because they correspond to the methods according to the embodiments, they are described simply, and the relevant parts may refer to the description on the part of the method.

A person skilled in the art may further realize that the units and the algorithm steps of the examples described with reference to the embodiments disclosed herein may be implemented by the electronic hardware, computer software or a combination thereof. In order to clearly explain the interchangeability between the hardware and the software, the above description has described generally the composition and the steps of the examples according to the functions. Whether those functions are executed by hardware or software depends on the applications and the design constraints of the technical solutions. A person skilled in the art may employ different methods to implement the described functions with respect to each of the applications, but the implementations should not be considered as extending beyond the scope of the present disclosure.

The data storing method, an apparatus, the electronic device and the readable storage medium according to the present disclosure have been described in detail above. The principle and the embodiments of the present disclosure are described herein by using the examples, and the description of the above embodiments is merely intended to facilitate to comprehend the method of the present disclosure and its core concept. It should be noted that a person skilled in the art may make some improvements and modifications on the present disclosure without departing from the principle of the present disclosure, and all of the improvements and modifications fall within the protection scope of the claims of the present disclosure.

The invention claimed is:

1. A data storing method, comprising:
constructing a data region and an external source-tracing region in a magnetic disk of a distributed storage system in advance, wherein the data region and the external source-tracing region have a corresponding relation, and in an internal memory, simultaneously constructing an internal source-tracing region corresponding to the external source-tracing region;
when it is detected that the data region is written with a target datum, writing source-tracing information corresponding to the target datum into the internal source-tracing region; and
downwardly swiping data of the internal source-tracing region to the external source-tracing region, to store source-tracing information of the data region by the external source-tracing region.

2. The data storing method according to claim 1, wherein after downwardly swiping the data of the internal source-tracing region to the external source-tracing region, the method further comprises:
when a data-consistency-test injection fault instruction is received, based on the corresponding relation, according to an address of the data region, calculating an address of the external source-tracing region; and
based on the address of the external source-tracing region, from the external source-tracing region, obtaining data-source information corresponding to data blocks in the data region.

3. The data storing method according to claim 1, wherein after downwardly swiping the data of the internal source-tracing region to the external source-tracing region, the method further comprises:
when it is detected that a production environment has a fault, based on the corresponding relation, according to an address of the data region, calculating an address of the external source-tracing region; and based on the address of the external source-tracing region, from the external source-tracing region, obtaining data-source information corresponding to data blocks in the data region.

4. The data storing method according to claim 1, wherein after downwardly swiping the data of the internal source-tracing region to the external source-tracing region, the method further comprises:

scanning the data region; and determining data-source information within the external source-tracing region that corresponds to each of blocks of data within the data region, and joining data that are physically discontinuous within the data region into a logical continuous datum, to perform a data-recovery operation.

5. The data storing method according to claims 1, wherein after downwardly swiping the data of the internal source-tracing region to the external source-tracing region, the method further comprises:

when it is detected that a source-tracing-region recovering condition is satisfied, sending a source-tracing-region recovering instruction; and based on the source-tracing-region recovering instruction, converting the external source-tracing region into the data region for storing a to-be-written datum.

6. The data storing method according to claim 5, wherein when it is detected that the source-tracing-region recovering condition is satisfied, sending the source-tracing-region recovering instruction comprises:

in response to that a residual-space-capacity value of the data region is less than a preset capacity threshold, determining that the source-tracing-region recovering condition is satisfied; and in response to that the residual-space-capacity value of the data region is greater than or equal to the preset capacity threshold, determining that the source-tracing-region recovering condition is not satisfied.

7. The data storing method according to claim 5, wherein when it is detected that the source-tracing-region recovering condition is satisfied, sending the source-tracing-region recovering instruction comprises:

in response to that a disk-space utilization ratio is greater than a preset threshold, determining that the source-tracing-region recovering condition is satisfied; and in response to that the disk-space utilization ratio is less than or equal to the preset capacity threshold, determining that the source-tracing-region recovering condition is not satisfied.

8. The data storing method according to claim 1, wherein the source-tracing information is used to describe attribute information of a datum that is actually written.

9. The data storing method according to claim 1, wherein the source-tracing information comprises a serial number of data writing, a value of an occupied space capacity and a storage position.

10. The data storing method according to claim 1, wherein the data region is used to store a datum that is actually written.

11. An electronic device, wherein the electronic device comprises a processor and a memory, and the processor is configured for, when executing a computer program stored in the memory, implementing the steps of the data storing method according to claims 1.

12. The electronic device according to claim 11, wherein after downwardly swiping the data of the internal source-tracing region to the external source-tracing region, the method further comprises:

when a data-consistency-test injection fault instruction is received, based on the corresponding relation, according to an address of the data region, calculating an address of the external source-tracing region; and based on the address of the external source-tracing region, from the external source-tracing region, obtaining data-source information corresponding to data blocks in the data region.

13. The electronic device according to claim 11, wherein after downwardly swiping the data of the internal source-tracing region to the external source-tracing region, the method further comprises:

when it is detected that a production environment has a fault, based on the corresponding relation, according to an address of the data region, calculating an address of the external source-tracing region; and based on the address of the external source-tracing region, from the external source-tracing region, obtaining data-source information corresponding to data blocks in the data region.

14. The electronic device according to claim 11, wherein after downwardly swiping the data of the internal source-tracing region to the external source-tracing region, the method further comprises:

scanning the data region; and determining data-source information within the external source-tracing region that corresponds to each of blocks of data within the data region, and joining data that are physically discontinuous within the data region into a logical continuous datum, to perform a data-recovery operation.

15. The electronic device according to claim 11, wherein after downwardly swiping the data of the internal source-tracing region to the external source-tracing region, the method further comprises:

when it is detected that a source-tracing-region recovering condition is satisfied, sending a source-tracing-region recovering instruction; and based on the source-tracing-region recovering instruction, converting the external source-tracing region into the data region for storing a to-be-written datum.

16. The electronic device according to claim 15, wherein when it is detected that the source-tracing-region recovering condition is satisfied, sending the source-tracing-region recovering instruction comprises:

in response to that a residual-space-capacity value of the data region is less than a preset capacity threshold, determining that the source-tracing-region recovering condition is satisfied; and in response to that the residual-space-capacity value of the data region is greater than or equal to the preset capacity threshold, determining that the source-tracing-region recovering condition is not satisfied.

17. The electronic device according to claim 15, wherein when it is detected that the source-tracing-region recovering condition is satisfied, sending the source-tracing-region recovering instruction comprises:

in response to that a disk-space utilization ratio is greater than a preset threshold, determining that the source-tracing-region recovering condition is satisfied; and in response to that the disk-space utilization ratio is less than or equal to the preset capacity threshold, determining that the source-tracing-region recovering condition is not satisfied.

18. A non-transitory readable storage medium, wherein the non-transitory readable storage medium stores a computer program, and the computer program, when executed by a processor, implements the steps of the data storing method according to claims 1.

19. The non-transitory readable storage medium according to claim 18, wherein after downwardly swiping the data of the internal source-tracing region to the external source-tracing region, the method further comprises:
   when a data-consistency-test injection fault instruction is received, based on the corresponding relation, according to an address of the data region, calculating an address of the external source-tracing region; and
   based on the address of the external source-tracing region, from the external source-tracing region, obtaining data-source information corresponding to data blocks in the data region.

20. The non-transitory readable storage medium according to claim 18, wherein after downwardly swiping the data of the internal source-tracing region to the external source-tracing region, the method further comprises:
   when it is detected that a production environment has a fault, based on the corresponding relation, according to an address of the data region, calculating an address of the external source-tracing region; and
   based on the address of the external source-tracing region, from the external source-tracing region, obtaining data-source information corresponding to data blocks in the data region.

* * * * *